(No Model.)
H. DIEBEL.
ROD OR PIPE CUTTER.
No. 443,431. Patented Dec. 23, 1890.
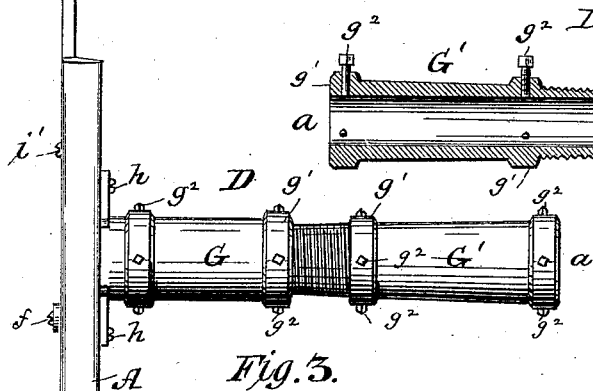
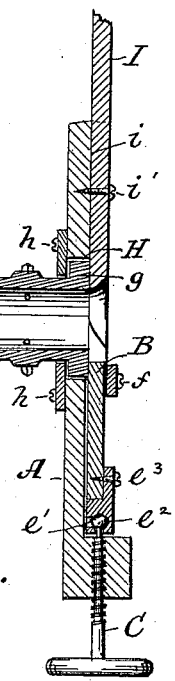
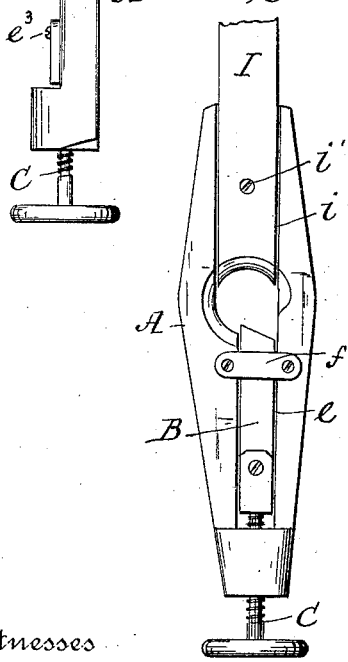
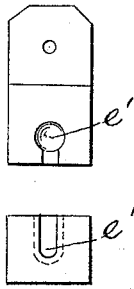
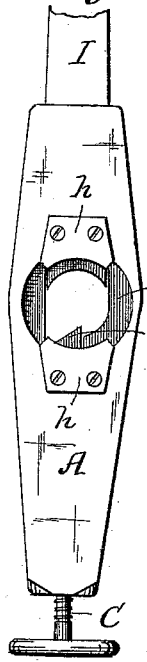
Witnesses
Sam<sup>l</sup> R. Turner
Van Buren Hillyard
Inventor
Henry Diebel
By his Attorneys

UNITED STATES PATENT OFFICE.

HENRY DIEBEL, OF SAUK CENTRE, MINNESOTA.

ROD OR PIPE CUTTER.

SPECIFICATION forming part of Letters Patent No. 443,431, dated December 23, 1890.
Application filed June 2, 1890. Serial No. 353,919. (No model.)

*To all whom it may concern:*

Be it known that I, HENRY DIEBEL, a citizen of the United States, residing at Sauk Centre, in the county of Stearns and State of Minnesota, have invented certain new and useful Improvements in Rod or Pipe Cutters; and I do hereby declare the following to be a full, clear, and exact description of the invention, such as will enable others skilled in the art to which it appertains to make and use the same.

This invention relates to tools for cutting thread or reducing the ends of shafts, spindles, axle-arms, &c.

The purpose of the invention is to provide a tool that will perform its work in a rapid and efficient manner, and which will be simple and compact in construction and convenient to operate.

The improvement consists in the novel features and peculiar construction and combination of the parts, which hereinafter will be more fully described, and shown in the accompanying drawings, in which—

Figure 1 is a side view of the cutting-tool embodying my invention. Fig. 2 is a central longitudinal section, parts being broken away, of the tool. Fig. 3 is a front view, and Fig. 4 is a rear view, of the tool, the guide-section being removed. Fig. 5 is a bottom plan and an end view of the block, which is in engagement with the set-screw and connects the same with the cutter.

The tool is composed of the frame or stock A, the adjustable cutter B, the set-screw C, and the tubular guide-section D. The stock is apertured at $a$ to receive the end of the pipe, tube, or shaft to be cut, and is provided with a longitudinal groove $e$, in which is fitted the cutter B, the latter being guided by its movements therein. The block is provided with recess $e'$, which receives the enlarged end $e^2$ of the set-screw C, and forms a positive connection between said set-screw and the block. This block is secured to the cutter B in any desired manner, as by the screw $e^3$. The cross-bar $f$, extending over the front end of groove $e$, holds the cutter B in the said groove $e$ at its front end.

The guide-section, composed of two tubular members G and G', is flanged at one end, as at $g$, which flanged end is fitted in recess H in the rear side of the stock A, and which is held therein by the plates $h$, which are secured to the stock at one end and have their inner ends overlapping the said flange $g$, as shown most clearly in Fig. 2. The sections G G' are of different bore to adapt a tool to different-sized pipes, shafts, spindles, &c., and are held together by the end of one screwing in the end of the other, or in any suitable manner. The sections are provided at intervals with annular projections $g'$, through which extend centering-screws $g^2$, for the purpose, first, of holding the guide-section on the pipe or shaft, and, second, for centering the said pipe or shaft in case the same is smaller than the bore of the said guide-section.

The operation of the tools is as follows: Suppose it to be desired to reduce the end of an axle or shaft, obviously the tool must be held in a fixed relative position. Hence the guide-section must be secured on the said shaft or axle, which is accomplished by means of the set-screws $g^2$. The tool being adjusted, the cutting is effected in the following manner: The set-screw C is screwed in until cutter B fits into the said shaft or axle. When the tool is rotated and removes a shaving, the screw C is turned in until the shaft or axle is reduced the required distance. This operation is repeated if the reduced end is not long enough, the tool being moved to a new position on the said shaft or axle. Obviously if it be required to cut a thread, the cutter B will be of such construction as to produce the thread, and the tool must have a free movement on the said shaft or axle.

For convenience of turning the tool, the same is provided with handle I, which is fitted in a groove $i$ in the face of the stock, being held therein by a screw $i'$. The inner end of handle I comes directly opposite the cutter B and receives the thrust when the said cutter is forced onto the pipe, the shaft, or axle. In the event of wear the said handle I can be adjusted to take up the same.

Having thus described my invention, what I claim, and desire to secure by Letters Patent, is—

1. In a cutting and threading tool, the combination, with the stock having central opening $a$ and having grooves $e$ and $i$ on diametrically-opposite sides of said opening $a$, of the cutter fitted in one groove, means for adjusting the cutter in the said groove, and the handle secured in the other groove and having its inner end flush with the said opening $a$ and adapted to receive the thrust or working pressure, substantially as set forth.

2. A cutting and threading tool comprising the stock having opening $a$, grooves $e$ and $i$ on diametrically-opposite sides of the said opening, and having recess H in its rear side, the guide-section having its flanged end inserted in the said recess H and held therein by plates $h$, the cutter B in the groove $e$, the set-screw C for adjusting cutter B, and the handle I, secured in the groove $i$ and having its inner end extended flush with opening $a$ and adapted to receive the thrust, substantially as specified.

In testimony whereof I affix my signature in presence of two witnesses.

HENRY DIEBEL.

Witness:
  CHARLES A. MORSE,
  P. LAMB.